Jan. 9, 1968     D. B. BURKHARDT     3,362,786
SULFUR TRIOXIDE PRODUCTION
Filed Oct. 5, 1965
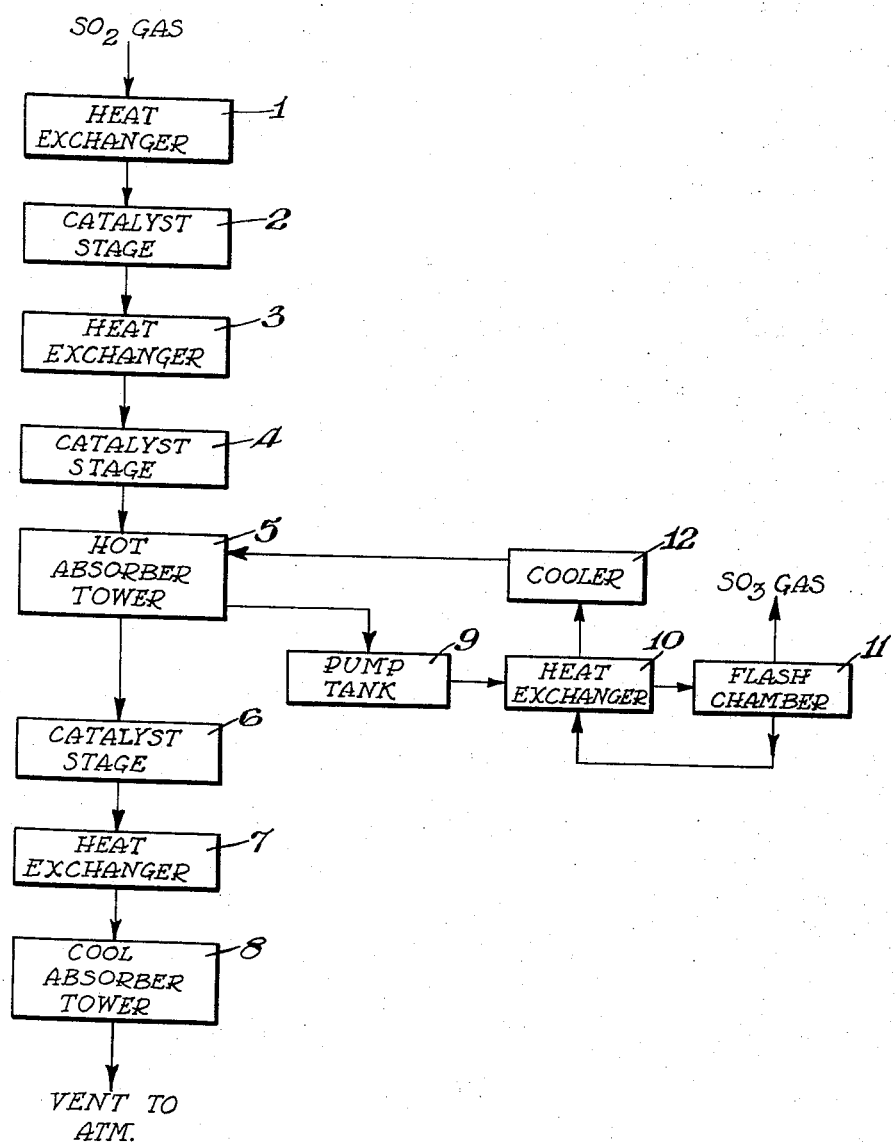
INVENTOR.
Donald B. Burkhardt
BY
ATTORNEY

3,362,786
SULFUR TRIOXIDE PRODUCTION
Donald B. Burkhardt, 20 Monterry Drive,
Newark, Del. 19711
Filed Oct. 5, 1965, Ser. No. 493,111
18 Claims. (Cl. 23—175)

ABSTRACT OF THE DISCLOSURE

Sulfur trioxide is concentrated by passing the crude material containing it through an absorbent that removes it from the impurities which are allowed to pass through the absorbent and then heating the resultant absorbent which contains the sulfur trioxide to release the said trioxide.

---

This invention relates to the production of sulfur trioxide. More particularly, it relates to a multi-stage catalysis in the oxidation of sulfur dioxide to sulfur trioxide and to trioxide concentration in such a process.

The common method of producing sulfur trioxide is the catalytic oxidation of sulfur dioxide with oxygen-containing gas using multi-stage reactors employing vanadium catalysts. The method is well illustrated in plants designed for the manufacture of sulfuric acid by the contact process in which a gas stream containing 6 to 10% sulfur dioxide and 11 to 15% oxygen by volume is passed through several vanadium catalyst layers in series to convert the sulfur dioxide gas to sulfur trioxide gas which is then cooled and absorbed in sulfuric acid in packed towers. The catalyst layers are usually operated adiabatically so that the gas becomes heated as the exothermic reaction proceeds. The extent of conversion of the sulfur dioxide to sulfur trioxide achieved in each layer depends on the exit gas temperature in relation to the thermodynamic equilibrium limitation for this reversible reaction; because of this relationship, it is necessary to cool as one goes from one catalyst layer stage to the next in order to obtain progressively higher conversion levels. Because of the thermodynamic limits, the amount of conversion realized in adiabatic, multi-stage reactors employing vanadium catalysts ranges between 95–98% in practice. The unconverted sulfur dioxide in the gas vented to the atmosphere ranges between 0.20–0.60% sulfur dioxide by volume; this quantity represents a loss of the feed raw materials and results in higher costs of producing sulfur trioxide and sulfuric acid as well as causing damage to people, animals, and vegetation by polluting the atmosphere.

In addition to the usual brimstone sulfur source, the sulfur dioxide feed gas for the production of sulfur trioxide may be generated by the oxidation of metallic sulfides, by combustion of hydrogen sulfide gas, by decomposition of spent sulfuric acid, etc. in which the resulting sulfur dioxide feed gas is deficient in oxygen to the extent that the oxygen/sulfur dioxide ratio is less than the usual ratio of 1.0/1 to 1.5/1. Since the thermodynamic limitation is dependent on the oxygen/sulfur dioxide ratio, air is sometimes added to the gas stream to raise the ratio and oxygen content to achieve higher conversion. However, air addition increases the volume of gas to be handled, and the equipment must be made larger in size. This requires greater investment and operating costs.

Consideration of the law of mass action leads to the conclusion that higher conversion of the sulfur dioxide to the desired sulfur trioxide product can be achieved by removing part or all of the sulfur trioxide at some intermediate point in the multi-stage reactor. This conclusion has been realized in the past, and the literature describes several processes for removing sulfur trioxide from the gas stream between stages. Usually, the sulfur trioxide removal process described in the literature involves (a) cooling the gas stream from an intermediate reactor stage by indirect means in a shell-and-tube heat exchanger, (b) absorbing the sulfur trioxide, gas in sulfuric acid solutions at 100–200° C. in packed towers, and (c) reheating the tower exit gas stream to vanadium catalyst ignition temperatures which are about 400–450° C., the heating being done indirectly in shell-and-tube heat exchangers prior to subsequent further passage of the gas through one or more of the catalyst stages before the final cooling and absorption of the remaining sulfur trioxide by sulfuric acid again in packed towers. Claims are made that conversion of the feed sulfur dioxide to product sulfur trioxide of 99.0–99.5% can be obtained by intermediate absorption. However, the need to cool and reheat the gas stream before and after intermediate absorption requires the installation of expensive, extensive, heat transfer equipment which results in higher investment and operating costs. The fact that the above methods are not widely employed is indicative that they are not economical.

Further, the sulfur trioxide gas produced by the above methods results in a sulfur trioxide concentration from the last stage of the reactor of only 6–12% sulfur trioxide by volume. To manufacture 100% sulfur trioxide by the above methods, it is necessary to absorb the 6–12% sulfur trioxide content in oleum solutions (usually 30% oleum) in a separate packed tower, and then to heat the oleum to distill off a vapor of 100% sulfur trioxide content which is then condensed to produce the common 100% liquid sulfur trioxide. In the absorption and distillation of sulfur trioxide using the 30% oleum, some sulfur dioxide is present in the sulfur trioxide stream but is not condensed with the sulfur trioxide except for that portion which is soluble in the liquid sulfur trioxide; hence, in the present processes the product sulfur trioxide is usually contaminated with other compounds. Since the production of concentrated sulfur trioxide gas or liquid requires additional equipment, its manufacture results in greater investment and operating costs.

An object of the invention is to provide a process for producing a more concentrated sulfur trioxide product from a gas stream containing sulfur trioxide. A further purpose is to permit the separated, more concentrated sulfur trioxide product to be recovered as a gas, liquid or solid. Another aim is to provide a method of obtaining a relatively pure sulfur trioxide product from a gas stream containing other gaseous, liquid, or solid compounds in which the concentration is below 12% sulfur trioxide by volume. A further purpose is providing a process for economically converting more of the feed sulfur dioxide into the sulfur trioxide product. Another object of the process is to provide a means of reducing the amount of the sulfur dioxide content in the exit gases vented to atmosphere so that air pollution is avoided.

A further purpose is to obtain more capacity and reduced sulfur dioxide emission from existing and future plants for the manufacture of sulfuric acid from sulfur dioxide. Another aim is to reduce the amount and concentration of sulfur dioxide emitted from the exit gases of powerhouse boilers utilizing solid, liquid, or gaseous fuels containing sulfur compounds that are converted to sulfur dioxide during combustion in the boilers. An additional object is to feed gas containing greater sulfur dioxide concentrations than usual so that equipment sizes, hence investment costs, may be reduced and yet equivalent sulfur trioxide production rate is maintained and so that the sulfur dioxide concentration in the exit gas emitted to atmosphere is reduced. These and other objectives will appear hereinafter.

The present invention is a process for the production of sulfur trioxide from gases containing sulfur dioxide and oxygen by the multi-stage catalysis via oxidation with intermediate absorption of the sulfur trioxide in which gases with 4–30% sulfur dioxide, but usually 10% sulfur dioxide, by volume are used. The catalytic oxidation of sulfur dioxide to sulfur trioxide takes place in two or more stages followed by an intermediate absorption of the sulfur trioxide by a selective absorbent prior to the last catalyst stage. The catalysis is carried out without any external supply of heat and the last catalyst stage does not involve heating by the gases from previous catalytic stages. The intermediate absorption involves the removal of sulfur trioxide gas from the gas stream by certain chemical compounds having the property of selectively absorbing sulfur trioxide gas at about 350° C. to about 500° C. This permits the remaining sulfur dioxide in the gas stream to be further converted to sulfur trioxide by passing through one or more catalyst stages without the necessity of first cooling the gas stream entering the intermediate absorption step to below 350° C. and later reheating the gas stream for the intermediate absorption step to at least 350° C., depending on the catalyst ignition temperature in subsequent stages. When using the process according to this invention, conversions of 99.0% or higher are possible since the thermodynamic equilibrium limits are favorably altered by the resulting improvement in the oxygen/sulfur dioxide ratio of gas leaving the intermediate absorption step.

The process of this invention is also capable of producing relatively pure, high-strength sulfur trioxide in gas, liquid, or solid state. However, this process is only described herein for producing concentrated sulfur trioxide in gaseous state since the other states may be easily achieved by known means of cooling. Thus, the process is capable of increasing the concentration of sulfur trioxide from the usual 6–10% by volume in the reacting gas stream to about 100% sulfur trioxide in the recovered sulfur trioxide gas stream.

The compounds which selectively absorb sulfur trioxide at low concentration from the reacting gas stream at 350° C. to 500° C. are capable of releasing the absorbed sulfur trioxide when heated to about 550° C. or higher, but usually in the range of about 580° C. to about 620° C. Heating of the selective absorbent is done separately from the absorption equipment so that the desorbed sulfur trioxide may be separately collected and recovered without being diluted by the other components in the reacting gas stream. Separate recovery of the sulfur trioxide in the process of this invention permits the concentration of sulfur trioxide to be greater than it was in the gas stream from which it was absorbed. The use of the process to concentrate sulfur trioxide gas has important technical and economical advantages over present methods of producing gases having more than 15% sulfur trioxide by volume.

The invention will be further understood by the reference to the figure and to the description below, all of which is not limitative but is given for illustration purposes only.

The figure is a flow sheet showing the various steps that are taken in the process of this invention.

The sulfur dioxide feed gas with oxygen in it and from any source at any suitable pressure but usually at 5–10 p.s.i.g. is passed through the heat exchanger 1 where it is either heated or cooled, directly or indirectly, so that it enters the first catalyst stage 2 at the desired temperature, normally about 380° C. to about 430° C. The oxidation of the sulfur dioxide proceeds to form sulfur trioxide gas adiabatically in the first stage as far as possible depending on the catalyst activity and quantity, and the thermodynamic limitations. The temperature of the reacting gas will increase due to the exothermic reaction, and the exit gas is cooled to about 380° C. to about 430° C. either directly or indirectly in the heat exchanger 3 prior to passing to the second catalyst stage 4 where further oxidation of the sulfur dioxide to sulfur trioxide takes place, and the gas leaves the stage 4 at about 450° C. to about 500° C. with 60–90% of the sulfur dioxide feed converted. The gas stream, without further cooling or heating, is then passed through the hot absorber tower 5 where the sulfur trioxide in the gas stream is removed by contact with a selective absorbent at about 380° C. to about 450° C. as explained below. The pressure of the gas stream entering the absorbent may be subatmospheric or superatmospheric, and it is preferably at a pressure of about 14 p.s.i.a. to about 25 p.s.i.a. The unabsorbed gases from the hot absorber tower 5 at said temperature of 380° C.–450° C. are then passed through another catalyst stage 6 for further conversion of the remaining sulfur dioxide gas, and then are cooled directly or indirectly to about 200° C. in the heat exchanger 7 prior to entering the cool absorber tower 8 where the remaining sulfur trioxide gas is absorbed by 98–99% sulfuric acid. The gases from the cool absorber 8 are then vented to atmosphere. They will usually contain less than 0.1% sulfur dioxide by volume indicating that at least 99% of the feed sulfur dioxide has been converted to the desired sulfur trioxide product in the invented process.

The liquid selective absorbent leaves the hot absorber tower 5 to enter the pump tank 9 from which the absorbent is pumped through a heat exchanger 10 for heating prior to entering the flash chamber 11. In the chamber, further indirect heating of the absorbent to the range of about 550° C. to about 650° C. takes place, and the sulfur trioxide product gas is desorbed from the absorbent in a quantity equal to the amount of sulfur trioxide absorbed in the hot absorber tower 5. The pressure above the absorbent during the desorption may be subatmospheric or superatmospheric and is preferably between 1 p.s.i.a and 25 p.s.i.a. The hot absorbent from the chamber 11 is passed through the heat exchanger 10 where it is partially cooled indirectly and then enters the cooler 12 where its temperature is reduced to the said range of 380° C.–430° C. before being recycled to the hot absorber tower 5 again. The 100% sulfur trioxide gas from the flash chamber 11 may be processed separately to produce liquid or solid sulfur trioxide or may be reintroduced into the gas stream between the exchanger 7 and the absorber 8 for subsequent absorption and conversion to sulfuric acid.

The selective absorbent for removing sulfur trioxide gas in the absorber 5 consists of compounds containing vanadium and alkali metals as sulfates commonly known as pyrosulfates. Such compounds have the important property of selectively absorbing sulfur trioxide gas at temperatures of about 350° C.–500° C. with temperatures of about 380° C. to about 450° C. being preferred, and desorbing sulfur trioxide gas at temperatures of about 550° C. or higher without absorbing any sulfur dioxide gas which may be present with the initial sulfur trioxide in the reacting gas stream. The vanadium pyrosulfates of interest can have a wide range of the alkali metal/vanadium ratio, and may have various promoters such as small portions of other alkali sulfates added to enhance the sulfur trioxide absorption property. In general, a vanadium pyrosulfate having a mol ratio of alkali metal to vanadium in the range of 2/1 to 6/1, wherein the metal may be lithium, sodium, potassium, rubidium, cesium, or thallium, each being either alone or in various proportions with one or more of the others. It is preferred to use potassium as the primary alkali metal to form the vanadium pyrosulfate/alkali metal pyrosulfate used as the selective absorbent for the sulfur trioxide gas. The pyrosulfate is kept in the liquid state during absorption and desorption of the sulfur trioxide gas.

This invention will be further understood by reference to the following examples which are given for illustrative purposes only and are not limitative.

EXAMPLE I

A gas stream at 400° C. containing 5% oxygen, 8% sulfur trioxide, 2% sulfur dioxide and 85% nitrogen by volume was passed through a small cast-iron tower 6 inches in diameter and 4 ft. long and packed with pieces of quartz. The flow was countercurrent to a downward flowing stream of liquid vanadium pyrosulfate/potassium pyrosulfate based on potassium in the molar ratio of 3.5 parts potassium to 1.0 part vanadium at 400° C. The gas leaving the tower was found to contain only 0.5% sulfur trioxide by volume but all of the oxygen, sulfur dioxide and nitrogen that had entered the tower; hence, 94% of the sulfur trioxide gas entering the absorber tower was absorbed by the pyrosulfate solution while the other gases were not absorbed or removed by said solution. The experiment indicated that the vanadium potassium pyrosulfate has the property of absorbing sulfur trioxide gas at 400° C.

EXAMPLE II

Part of the pyrosulfate solution from Example I was removed from the tower circulating system and placed in an apparatus which could be indirectly heated to 700° C. and which contained means by which any gas which evolved could be separately collected by absorption in 50% aqueous sodium hydroxide. The pyrosulfate liquid was heated slowly from 400° C. up to 600° C., and the gas evolved was observed, collected, and measured. No vapor was evolved until the pyrosulfate liquid reached about 550° C., and vapor continued to evolve until the liquid reached 600° C. at which point the gas evolution decreased rapidly until at 620° C. it ceased. Titration of the sodium hydroxide solution showed the formation of sodium sulfate in amounts nearly equal to the proportional quantity of sulfur trioxide absorbed by the pyrosulfate in Example I. Hence, the vanadium potassium pyrosulfate had the property of releasing, desorbing, or emitting sulfur trioxide gas at in said range of 550° C.–620° C.

EXAMPLE III

The vanadium potassium pyrosulfate from Example II was placed in an apparatus, and the sulfur trioxide gas of Example I composition was bubbled through the liquid pyrosulfate at 400° C. Analysis of the exit gas stream showed that about 95% of the sulfur trioxide in the feed gas was absorbed by the pyrosulfate solution. Hence, the effluent pyrosulfate from Example II had the property of again absorbing sulfur trioxide gas at 400° C.

Tests were made using vanadium pyrosulfates containing sodium, lithium, rubidium, cesium, and thallium pyrosulfates in place of the potassium pyrosulfate for absorbing and desorbing sulfur trioxide from gas streams having the composition of the feed gas in Example I. They were found to absorb in said preferred temperature range of 380° C.–450° C. and desorb in said range of 550° C.–620° C. While pyrosulfates based on the above metals showed results more or less similar to potassium pyrosulfate, those based on potassium/vanadium molar ratios between 2/1 and 6/1, with 3.5/1 preferred, offer low preparation cost and freedom from toxicity to people and are preferred.

Analysis of the gas evolved from the heating of vanadium potassium pyrosulfate showed that it was nearly 100% sulfur trioxide in composition and that sulfur dioxide gas was absent. Hence, by the use of pyrosulfates, it is possible to concentrate sulfur trioxide gas from dilute concentrations (under 15% by volume) to produce 100% sulfur trioxide gas, separating it from other components, and particularly from sulfur dioxide gas.

EXAMPLE IV

The unabsorbed gases from Example I containing about 2.1% sulfur dioxide, 5.4% oxygen, 0.5% sulfur trioxide, and the rest nitrogen were passed through a layer of vanadium catalyst pellets at about 430° C.–450° C. to determine whether the sulfur dioxide could be further oxidized to sulfur trioxide. The resultant analysis of gas leaving the catalyst pellets showed that about 95–96% of the sulfur dioxide entering the catalyst pellets had been converted to sulfur trioxide gas; the exit gas showed less than 0.10% sulfur dioxide by volume.

It is well known in commercial practice and confirmed by thermodynamic data that the conversion of sulfur dioxide in the initial feed gas of Example I without removal of the sulfur trioxide formed in Example I will not proceed to the same extent as under the conditions of this invention, and that the sulfur dioxide concentration of the exit gas from a conversion step comparable to that of Example IV would be at least 0.20%. Hence, removal, by the process of this invention, of most of the sulfur trioxide gas from the gas entering the catalyst layers in commercial sulfuric acid manufacturing plants will result in further conversion of the sulfur dioxide to the desired sulfur trioxide or sulfuric acid product. Therefore, the process of this invention provides a means of attaining better utilization of the sulfur dioxide feed gas. Further by virtue of reducing the unconverted sulfur dioxide in the exit gas from the catalytic oxidation steps a decrease in the pollution of atmospheric air from sulfur dioxide odor and concentrations is achieved.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

I claim:

1. A process for concentrating sulfur trioxide which comprises passing a gaseous mixture containing sulfur trioxide into a liquid absorbent that removes the sulfur trioxide from the other constituents in said mixture said absorbent comprising a mixture of vanadium pyrosulfate and an alkali metal pyrosulfate; allowing the said other constituents to pass through said absorbent; and then heating said absorbent containing the sulfur trioxide to release the absorbed sulfur trioxide.

2. A process in accordance with claim 1 in which said alkali metal pyrosulfate is selected from the group consisting of sodium pyrosulfate, potassium pyrosulfate, lithium pyrosulfate, rubidium pyrosulfate, cesium pyrosulfate and thallium pyrosulfate.

3. A process in accordance with claim 1 in which said alkali metal pyrosulfate is potassium pyrosulfate.

4. A process in accordance with claim 1 in which the ratio of the alkali metal pyrosulfate to the vanadium pyrosulfate is between 2 to 1 and 6 to 1.

5. A process in accordance with claim 4 in which the said ratio is between 3 to 1 and 4 to 1.

6. A process in accordance with claim 1 in which the said constituents passing through said mixture are in the form of a gas containing sulfur dioxide and this gas is passed to a reactor and the sulfur dioxide is oxidized in the presence of oxygen to form more sulfur trioxide.

7. A process in accordance with claim 1 in which the said released sulfur trioxide is collected.

8. A process in accordance with claim 1 in which said liquid absorbent comprises a mixture of vanadium pyrosulfate and an alkali metal pyrosulfate which mixture is heated to a temperature of about 350° C. to about 500° C. when it receives said gaseous mixture.

9. A process in accordance with claim 8 in which said temperature is about 380° C. to about 450° C.

10. A process in accordance with claim 1 in which the gaseous mixture is under a pressure of about 14 p.s.i.a. to about 25 p.s.i.a.

11. A process in accordance with claim 1 in which the heating of said absorbent to effect said release of sulfur trioxide effects a temperature of about 550° C. to about 650° C.

12. A process in accordance with claim 11 in which said temperature is about 580° C. to about 600° C.

13. A process in accordance with claim 11 in which said step of heating said absorbent is effected with the absorbent being under a pressure of about 1 p.s.i.a. to about 25 p.s.i.a.

14. A process for the production of sulfur trioxide which comprises reacting sulfur dioxide with oxygen contained in a gaseous mixture, forming sulfur trioxide thereby; passing the resultant gaseous mixture to a liquid absorbent that absorbs the sulfur trioxide and none of the other constituents in said resultant gaseous mixture, thereby forming a new gaseous mixture containing very little, if any, sulfur trioxide said absorbent comprising a mixture of vanadium pyrosulfate and an alkali metal pyrosulfate; reacting any sulfur dioxide remaining in the said new gaseous mixture with oxygen to further the conversion to sulfur trioxide, thereby forming a gaseous stream containing mainly sulfur trioxide as the only sulfur compound and little, if any, sulfur dioxide; heating the absorbent containing absorbed sulfur trioxide to drive off the sulfur trioxide as a gas; and collecting the sulfur trioxide.

15. A process in accordance with claim 14 in which the said sulfur trioxide driven off as a gas from said absorbent is added to the said gaseous stream which contains little, if any, sulfur dioxide and mainly sulfur trioxide as the only sulfur compound.

16. A process in accordance with claim 14 in which said alkali metal pyrosulfate is potassium pyrosulfate.

17. A process in accordance with claim 14 in which said absorbent is at a temperature of about 350° C. to about 500° C. during said absorption of said sulfur trioxide.

18. A process in accordance with claim 14 in which said absorbent is heated to about 580° C. to about 600° C. to drive off the absorbed sulfur trioxide.

References Cited
UNITED STATES PATENTS 2,879,135  3/1959  Haltmeier _____ 23—168
3,243,261  3/1966  Deiters _____ 23—174

OTHER REFERENCES

Chem. Abstract. 53: 9796F, V. Spitsyn et al. (1958).

OSCAR R. VERTIZ, *Primary Examiner.*

A. J. GREIF, *Assistant Examiner.*